United States Patent [19]
Katagiri

[11] 3,944,009
[45] Mar. 16, 1976

[54] FRAME ASSEMBLY FOR TWO-WHEELED MOTORIZED VEHICLE

[75] Inventor: Nagatoshi Katagiri, Saitama, Japan

[73] Assignee: Honda Giken Kogyo Kabushiki Kaisha, Tokyo, Japan

[22] Filed: Mar. 14, 1975

[21] Appl. No.: 558,711

[30] Foreign Application Priority Data
Sept. 10, 1974 Japan............................ 49-103449
Sept. 10, 1974 Japan............................ 49-103450

[52] U.S. Cl................. 180/33 R; 224/35; 280/289
[51] Int. Cl.²......................................... B62K 19/40
[58] Field of Search ...... 180/30, 33 R, 35; 280/289, 280/202, 281, 54; 224/35

[56] References Cited
UNITED STATES PATENTS

| | | | |
|---|---|---|---|
| 2,051,823 | 8/1936 | Clarke | 224/35 |
| 2,071,761 | 2/1937 | Nicholson | 180/33 R |
| 2,080,677 | 5/1937 | Uber | 224/35 |
| 2,755,873 | 7/1956 | Klaue | 180/35 |
| 2,908,510 | 10/1959 | Lossau | 280/281 |

FOREIGN PATENTS OR APPLICATIONS
521,070  3/1955  Italy ............................ 280/289

*Primary Examiner*—Kenneth H. Betts
*Attorney, Agent, or Firm*—Haseltine, Lake & Waters

[57] ABSTRACT

A parts housing assembly is provided for a two-wheeled motorized vehicle. A bifurcated fork element is carried by a structural frame member of the vehicle and has a pair of elongated side support elements extending rearwardly therefrom. Side plates are supported on the side support elements, an upper cover element encloses the top of the side plates to define an intermediate chamber therewith. A pair of side housings are pivotally connected to the respective elongated support elements and cooperate with the edges of the upper cover to define with the side plates a pair of enclosed chambers. The fuel tank of the vehicle, which is normally located between the steering means and the operator's seat, is positioned elsewhere so as to afford greater stability for the vehicle.

8 Claims, 5 Drawing Figures

FRAME ASSEMBLY FOR TWO-WHEELED MOTORIZED VEHICLE

BACKGROUND OF THE INVENTION

This invention relates to a parts housing assembly for a two-wheeled motorized vehicle such as a motorcycle or the like.

It has been conventional with this kind of vehicle to position the fuel tank for an internal combustion engine at a position between the driver's seat and the steering handle at the front of the frame of the vehicle. In principle this has not always been necessary but tradition has dictated otherwise. It would be advantageous for this kind of two-wheeled vehicle to relocate the fuel tank in another portion of the vehicle body so as to enable a lowering of the position of the center of gravity for the whole of the vehicle and thereby improve the stability thereof.

SUMMARY OF THE INVENTION

A principal object of this invention is to provide a parts housing assembly for a two-wheeled motorized vehicle in which the fuel tank is relocated to a position other than that at which it is conventionally mounted.

Another object of the invention is to provide a parts housing assembly for a two-wheeled motorized vehicle in which the area normally occupied by the fuel tank is utilized for a storage compartment and in which additional storage compartments are provided on the sides of the frame.

Other objects and advantages of the invention will become readily apparent from the following description of the invention.

According to the present invention there is provided a parts housing assembly for a two-wheeled motorized vehicle including at least one enclosed storage area formed therby, a bifurcated fork element carried by a structural frame member of the vehicle, first and second elongated support elements mounted on opposed sides of said fork element and extending rearwardly therefrom, an operator's seat carried by said frame member to the rear of and spaced from the steering shaft of the vehicle, first and second generally vertically-extending plates supported respectively on said first and second elongated support elements and extending rearwardly from a point adjacent the location where said elongated support members are connected to said fork element, first and second outwardly-shaped side shell housing elements pivotally connected at their lower edges respectively to said first and second elongated support elements defining with said first and second vertically-extending plates first and second side storage chambers respectively, a horizontally-extending cover plate connected at an intermediate elevation between said first and second vertically extending plates, and an upper shell housing element pivotally connected at the front end thereof to a front portion of said cover plate to form an intermediate chamber defined by said upper shell housing element and the inner walls of said first and second vertically-extending plates.

BRIEF DESCRIPTION OF THE DRAWINGS

In order that the invention may be more fully understood it will now be described, by way of example, with reference to the accompanying drawings in which.

DETAILED DESCRIPTION OF THE INVENTION

Figure 1:
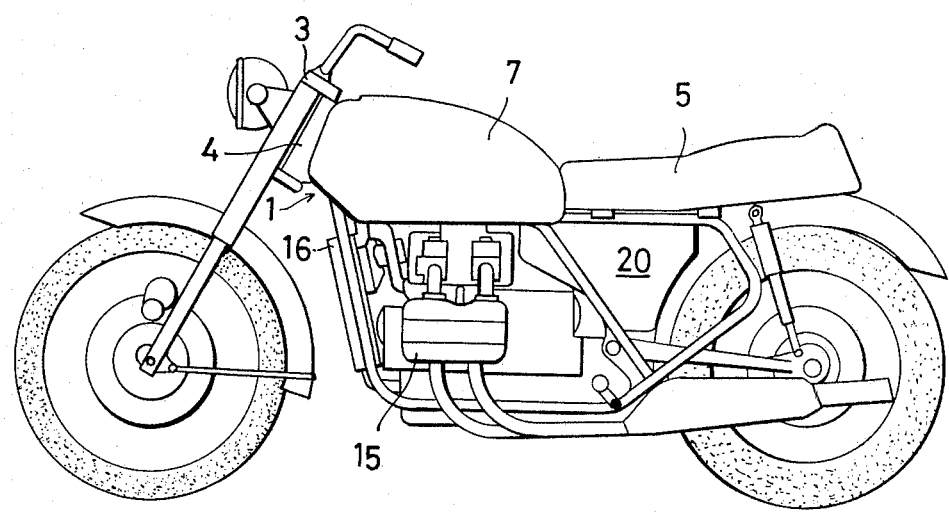
FIG. 1 is a side elevational view of a motorcylce incorporating the features of the invention.
Figure 2:
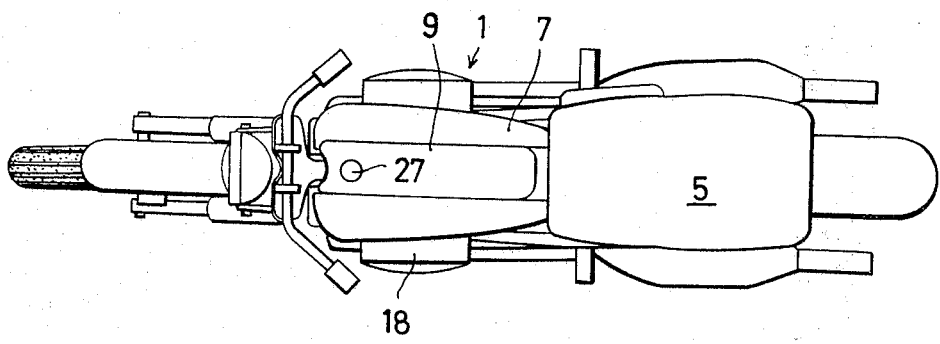
FIG. 2 is a top plan view of the motorcylce shown in FIG. 1.
Figure 3:
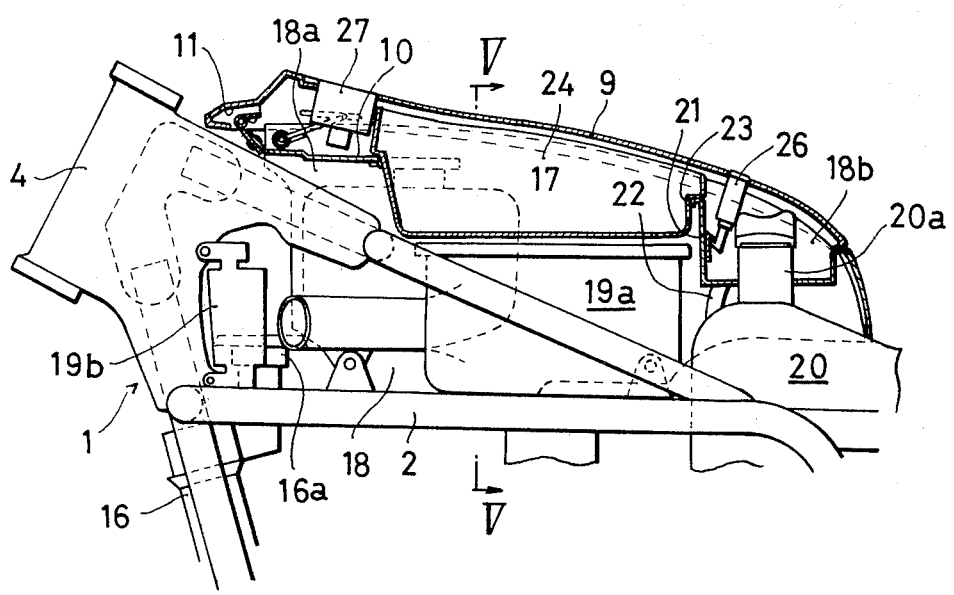
FIG. 3 is an enlarged side elevational view, partly in cross-section, of a preferred arrangement of elements in accordance with the invention.
Figure 4:
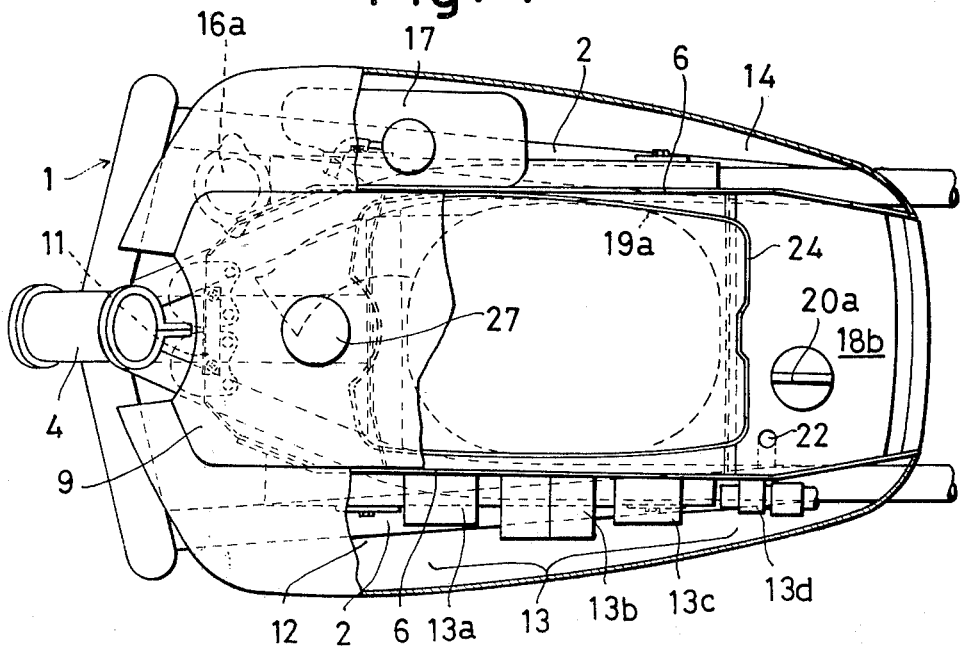
FIG. 4 is a top plan view, partly broken away and partly in cross-section, of the arrangement shown in FIG. 3.
Figure 5:
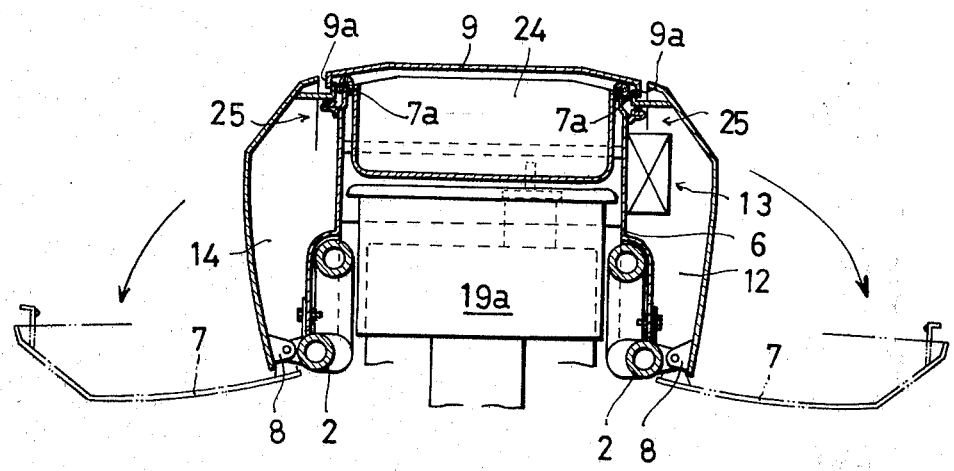
FIG. 5 is a cross-sectional view taken along line $\overline{V}-\overline{V}$ of FIG. 3.

Referring to the accompanying drawings there is shown a structural frame member or assemblage of members 1 for a motorcycle. The structural frame member is adapted to rotatably carry front and rear wheels and an internal combustion engine 15 of a conventional type. The engine is drivably connected to at least the rear wheel by usual means (not shown). A bifurcated fork element 4 at the head portion of the vehicle frame 1 is provided with a pair of elongated support elements 2 for supporting a steering shaft 3. The support elements are desirably formed of tubular material for the required strength. These support elements extend rearwardly from their point of connection with fork 4. A pair of frame plates 6 are attached to the two support elements 2 and extend generally vertically so as to be positioned between the fork 4 and a driver's seat 5 located in spaced relation behind the same.

On the outside surfaces of plates 6 side shell housing elements 7, each of which is shaped outwardly so as to present an inner concave surface, are pivotally attached at their lower edges by means such as hinges 8 to the support elements 2 so that such housing elements can be opened and closed at will. Additionally, an upper shell housing element 9 encloses the space between the two frame plates 6. The upper shell housing 9 is pivotally attached such as by means of a hinge 11 to a cover plate 10 which will be further described below, so as to be freely opened and closed. Projecting edges 7a are provided at the upper end portions of the side shell housing elements 7 and are arranged to engage with respective peripheral edges 9a of the upper shell housing 9 so that the side shell housing elements 7 cannot be opened before the upper shell housing 9 is first opened.

An outer side storage chamber 12 is formed between one of the plates 6, that is, the left hand plate 6 and the corresponding side shell housing element 7. Desirably, electric components 13 such as a fuse box 13a, a resistor 13b, a regulator 13c, and a coupler 13d or the like can be positioned within the chamber in such a manner that such components are attached to the plate 6. Another outside chamber 14 is formed between the other plate 6, that is, the right hand plate 6 and the corresponding side shell housing element 7. This chamber may be used to contain a liquid filler opening 16a of a radiator for the cooling of internal combustion engine 15 and for the housing of a subsidiary tank 17 for the same.

An intermediate chamber 18 is formed by the two plates 6 and the upper shell housing element 9. The interior of the intermediate chamber is divided into front and rear compartments 18a, 18b. The first compartment 18a contains an air cleaner 19a and an ignition coil 19b, and the upper surface of compartment 18a is covered by the foregoing covering plate 10 connected between the two plates 6 as shown. The second compartment 18b in the rear contains a fuel filler opening 20a connected to a fuel tank 20 which is provided below the seat 5 for the filling of such tank when desired.

Chamber wall 21 of U shape in cross-section defines the rear chamber 18b, this chamber 18b being opened at its upper surface. A drain pipe 22 is connected to the bottom of chamber 18b.

A recessed area 23 remains between the front of chamber wall 21 and the rear edge of the foregoing cover plate 10. A parts box 24 for containing tools or the like is removably mounted within recess 23, so that upon removal of box 24 any repairs or replacement of engine or related interior parts can be performed through the recess 23. A retaining member 25 is provided for retaining each side shell housing element 7 in its closed position. A cylinder lock 26 is provided for the upper shell housing 9. A fuel meter 27 is attached to the inner surface of the upper shell housing 9, and the calibrated face of the meter is exposed for visual inspection through an opening made in the upper shell housing element 9.

Thus, according to this invention, there are positioned between the head portion of the vehicle frame and the driver's seat at the rear portion thereof, the three chambers, i.e., the two outside chambers and the intermediate chamber covered by the upper shell housing. Various selected components can be positioned within these chambers, and also certain parts will be exposed and made accessible to the driver by opening of the appropriate shell housing element. Thus, inspection, replacement or repair of these parts is facilitated. In the case where the intermediate chamber is divided into the first and second compartments and the fuel filler opening of the fuel tank is positioned in one of them, one can prevent, upon the charging of fuel, the splashing of fuel or the leakage of overflowed fuel into undesired areas which may damage or cause deterioration of certain of the components. This results in increased safety. In the case where the recess is provided at its interior upper portion with the parts-containing storage box, tools or the like contained therein can be conveniently taken out immediately when the upper shell housing is opened. Additionally, in the case where the electric components and the liquid tank and related parts are separately contained in the outer side storage chambers, the electric components can be protected against being splashed with liquid so as to avoid troubles such as short-circuits or the like caused by the liquid. Furthermore, by attaching the fuel meter to the upper shell housing the mounting of such a meter on the vehicle is made simpler.

What is claimed is:

1. A parts-housing assembly for a two-wheeled motorized vehicle including at least one enclosed storage area formed thereby, a bifurcated fork element carried by a structural frame member of the vehicle, first and second elongated support elements mounted on opposed sides of said fork element and extending rearwardly therefrom, an operator's seat carried by said frame member to the rear of and spaced from the steering shaft of the vehicle, first and second generally vertically-extending plates supported respectively on said first and second elongated support elements and extending rearwardly from a point adjacent the location where said elongated support members are connected to said fork element, first and second outwardly-shaped side shell housing elements pivotally connected at their lower edges respectively to said first and second elongated support elements defining with said first and second vertically-extending plates first and second side storage chambers respectively, a horizontally-extending cover plate connected at an intermediate elevation between said first and second vertically extending plates, and an upper shell housing element pivotally connected at the front end thereof to a front portion of said cover plate to form an intermediate chamber defined by said upper shell housing element and the inner walls of said first and second vertically-extending plates.

2. A parts housing assembly according to claim 1, wherein a generally U-shaped wall member is connected between the inner walls of said first and second vertically-extending plates with the leg portions thereof extending upwardly to thereby divide said intermediate chamber into front and rear compartments.

3. A parts housing assembly according to claim 2, wherein said rear compartment is provided with an opening in the floor thereof dimensioned to accomodate conduit means in communication with the fuel tank of the vehicle for supplying fuel thereto.

4. A parts housing assembly according to claim 2, wherein selected auxilliary elements for the engine of the vehicle are mounted within said front compartment.

5. A parts housing assembly according to claim 2, wherein a storage box is removably mounted within said front compartment.

6. A parts housing assembly according to claim 1, wherein electrical components operably connected to the engine of the vehicle are mounted within one of said first and second side storage chambers and a tank for the storage of a liquid coolant for said engine is mounted within the other of said first and second side storage chambers.

7. A parts housing assembly according to claim 1, wherein a fuel meter is secured to said upper shell housing element, an opening being provided in said upper shell housing element for visually determining the reading of said fuel meter.

8. A parts housing assembly according to claim 1, wherein said first and second side shell housing elements are provided at their upper end portions with projecting edges which are cooperable with peripheral edges of said upper shell housing element to retain said side shell housing elements in a vertical position and thereby prevent the downward pivotal movement of said side shell housing elements until the upper shell housing element is first pivotally raised to release said projecting edges.

* * * * *